US012228554B2

(12) United States Patent
Inoue et al.

(10) Patent No.: US 12,228,554 B2
(45) Date of Patent: Feb. 18, 2025

(54) ELEMENTAL ANALYSIS DEVICE

(71) Applicant: HORIBA, LTD., Kyoto (JP)

(72) Inventors: Takahito Inoue, Kyoto (JP); Hiroshi Uchihara, Kyoto (JP)

(73) Assignee: HORIBA, LTD., Kyoto (JP)

( * ) Notice: Subject to any disclaimer, the term of this patent is extended or adjusted under 35 U.S.C. 154(b) by 242 days.

(21) Appl. No.: 18/000,027

(22) PCT Filed: Sep. 10, 2021

(86) PCT No.: PCT/JP2021/033380
§ 371 (c)(1),
(2) Date: Nov. 28, 2022

(87) PCT Pub. No.: WO2022/054920
PCT Pub. Date: Mar. 17, 2022

(65) Prior Publication Data
US 2023/0221292 A1 Jul. 13, 2023

(30) Foreign Application Priority Data
Sep. 14, 2020 (JP) .................. 2020-154064

(51) Int. Cl.
*G01N 31/12* (2006.01)
(52) U.S. Cl.
CPC .................... *G01N 31/12* (2013.01)
(58) Field of Classification Search
CPC ....... G01N 31/00; G01N 31/005; G01N 31/12
See application file for complete search history.

(56) References Cited

U.S. PATENT DOCUMENTS

| 4,419,754 A * | 12/1983 | Sitek ................ H05B 3/0014 |
| | | 219/427 |
| 9,042,425 B2 * | 5/2015 | Latino .................. G01N 31/12 |
| | | 422/62 |
| 9,808,797 B2 | 11/2017 | Wetzel et al. |

FOREIGN PATENT DOCUMENTS

| CN | 110672778 A | 1/2020 |
| JP | 54-103282 U | 7/1979 |

(Continued)

OTHER PUBLICATIONS

Keiko et al., Electrode Body, Apr. 1996, FIT machine translation (Year: 2017).*

(Continued)

*Primary Examiner* — Erika J. Villaluna
(74) *Attorney, Agent, or Firm* — LUCAS & MERCANTI, LLP

(57) ABSTRACT

An elemental analysis device includes a first electrode and a second electrode between which a crucible MP containing a sample is nipped, and that heats the sample. The second electrode includes a second electrode main body that has a tip end having a substantially cylindrical shape, a second electrode tip, a cap that nips the second electrode tip between the cap and the second electrode main body such that a part of the second electrode tip is exposed to an outside, and a second screwing structure that includes a male thread and a female thread provided between the second electrode main body and the cap, and the second screwing structure further includes a purge groove that extends in a pitch direction and that is provided as a cutout provided to a part of crests of a thread of at least one of the male thread and the female thread.

13 Claims, 11 Drawing Sheets

(56) References Cited

FOREIGN PATENT DOCUMENTS

| | | |
|---|---|---|
| JP | 62-162647 U | 10/1987 |
| JP | 08-086769 A | 4/1996 |
| JP | 2004-503757 A | 2/2004 |
| JP | 2009-053119 A | 3/2009 |
| JP | 2010-008245 A | 1/2010 |
| JP | 2014-044146 A | 3/2014 |
| JP | 2015-089817 A | 5/2015 |
| WO | 2001/095991 A | 12/2001 |

OTHER PUBLICATIONS

Point 3 Work time of maintenance and reduction of frequency—Adopted a new mechanism for replacement of consumables, (Horiba Ltd [online]), non-official translation (Solids oxygen, nitrogen, and hydrogen analyzer in EMGA series EMGA-Pro and Expert), Nov. 2021, 2 pages, with an English equivalent thereof, 8 pages.
International Search Report for the corresponding patent application No. PCT/JP2021/033380 dated Nov. 22, 2021, with English translation.

\* cited by examiner (a)

(b)

ELEMENTAL ANALYSIS DEVICE

CROSS REFERENCE TO RELATED APPLICATION

This Application is a 371 filed on of PCT/JP2021/033380 Sep. 10, 2021, which, in turn, claims priority of Japanese Patent Application No. 2020-154064 filed on Sep. 14, 2020, and the above applications are incorporated herein by reference.

TECHNICAL FIELD

The present invention relates to an elemental analysis device for analyzing elements contained in a sample based on a sample gas generated by heating the sample.

BACKGROUND ART

An elemental analysis device is used to quantify chemical elements such as nitrogen (N), hydrogen (H), and oxygen (O) contained in a sample. Such an elemental analysis device includes a pair of electrodes between which a graphite crucible containing a sample is nipped inside a heating furnace, and that heats the crucible and the sample by directly applying current to the crucible. The sample gas generated by heating is guided from the heating furnace to outside, and has concentrations of its various chemical components measured by an analyzing mechanism, such as a non-dispersive infrared gas analyzer (NDIR) or a thermal conductivity detector (TCD).

For example, the heating furnace of the elemental analysis device disclosed in Patent Literature 1 includes an upper electrode internal of which is provided with a housing recess, and a lower electrode on which a crucible is placed. By causing the lower electrode to elevate, the crucible comes to be housed inside the housing recess, in a manner nipped between the upper electrode and the lower electrode.

The lower electrode includes: a lower electrode main body having a substantially two-stepped cylindrical shape and having a tip end side on which a crucible is placed; a lower electrode tip provided on the tip end surface of the lower electrode main body; and a cap by which the lower electrode tip is fixed to the lower electrode main body. Specifically, a screwing structure including a male thread and a female thread is provided between the outer circumferential surface of the tip end of the lower electrode main body and the inner circumferential surface of the cap. In this manner, only the lower electrode tip can be replaced.

However, in the process of screwing the cap onto the lower electrode main body, the air may become trapped in a gap between the male thread and the female thread. When the inside of the furnace is filled with carrier gas, to heat the sample and carry out an elemental analysis, the trapped air may leak from the lower electrode, as a component other than those in the sample gas. In particular, when a very small amount of nitrogen (N) contained in the sample gas is to be measured, even a slight amount of air leakage will cause a significant error in the measurement, because the air contains nitrogen (N). In other words, by making the lower electrode tip replaceable, an error factor is added to the elemental analysis.

CITATION LIST

Patent Literature

Patent Literature 1: U.S. Pat. No. 9,808,797

SUMMARY OF INVENTION

Technical Problem

The present invention has been made in consideration of the problem described above, and an object of the present invention is to provide an elemental analysis device in which, when carrier gas is filled inside a furnace to discharge the air inside the furnace before an elemental analysis is started, the air trapped inside the electrode is quickly discharged so that the air is prevented from becoming mixed with a sample gas and causing a measurement error, while making the electrode tip replaceable.

Solution to Problem

In other words, an elemental analysis device according to the present invention is an elemental analysis device that includes a first electrode and a second electrode between which a crucible containing a sample is nipped, and that heats the sample by applying a current between the first electrode and the second electrode, wherein the second electrode includes a second electrode main body that has a tip end having a substantially cylindrical shape, a second electrode tip that is provided on a tip end surface of the second electrode main body, a cap that nips the second electrode tip between the cap and the second electrode main body in such a manner that a part of the second electrode tip is exposed to an outside, and a second screwing structure that includes a male thread and a female thread provided between the second electrode main body and the cap, and the second screwing structure further includes a purge groove that extends in a pitch direction and that is provided as a cutout provided to a part of crests of a thread of at least one of the male thread and the female thread.

With such a configuration, because the purge groove is provided, when the air inside the furnace is discharged by filling the carrier gas inside the furnace before the sample is heated at the time of an elemental analysis, the air residing in the gap between the male thread and the female thread can be discharged through the purge groove to the outside of the second electrode. Therefore, even when there is some air trapped inside the second electrode, the air does not get mixed with the sample gas. In this manner, a measurement error can be prevented while ensuring the replaceability of the second electrode tip. In particular, when a very small amount of nitrogen (N) contained in the sample gas is to be measured, it is possible to improve the measurement accuracy, as compared with that achieved by a conventional example.

In order to fix the second electrode tip with the cap, with the second electrode tip accurately aligned with the second electrode main body, a recess into which a part of the second electrode tip is fitted may be provided to the tip end surface of the second electrode main body.

In order to make it easy to attach an O ring for maintaining the internal sealability to the second electrode, and to allow the O ring to sufficiently exert its function in a configuration in which the second electrode is inserted into the housing recess of the first electrode, a stepped portion may be provided to a tip end side of the second electrode main body, and an O ring may be provided inside a ring-shaped groove formed by the stepped portion and a rim of the cap when the cap is screwed onto the second electrode main body.

In order to sufficiently discharge the air residing between the crests of the threads to the outside via the purge groove, during the process of attaching the cap to the second electrode main body, a purge channel connecting the inside of the second screwing structure to the outside of the second electrode may be provided, and the purge groove may make up at least a part of the purge channel.

In order to sufficiently discharge the air flowing along the purge groove in a direction in which the cap advances to outside, in the process of screwing the cap onto the second electrode main body, the cap may include an exposure opening through which the second electrode tip is exposed to the outside, a top surface including a pressing plate provided around the exposure opening and pressing the second electrode tip against the tip end surface of the second electrode main body when the cap is screwed onto the second electrode main body, and a side surface having a substantially cylindrical shape and having an inner circumferential surface provided with the female thread.

In order to suppress a deterioration of the performance at which the air is discharged from the inside to the outside of the second electrode even when the purge groove deforms or dust becomes deposited as a result of repeated analyses, the cap may further include one or more vent holes provided on the top surface, on an outer side of the exposure opening.

In order to further improve the performance at which the air is discharged by enlarging a route through which air can be discharged not only on the side of the top surface of the cap but also on the side of an end of the cap, the cap may further include one or more gas discharge grooves extending in the side surface, from an inner circumferential side to an outer circumferential side.

As one possible configuration for providing the purge channel in such a manner that the air in the second screwing structure is discharged to the outside of the second electrode via the vent holes or the gas discharge groove, the purge groove may be provided to the female thread of the cap.

Even in a configuration in which the purge groove is provided to the male thread of the electrode main body, for example, by providing the purge channel connecting the inside of the second screwing structure to the outside of the second electrode via the vent holes of the cap, for example, it is possible to discharge the gas residing between the crests of the threads to the outside.

Even in the configuration in which the purge groove is provided to the male thread of the electrode main body, in order to enable the air to be discharged from the bottom, via the gas discharge groove, a ring-shaped recess may be provided near a base end of the male thread of the second electrode main body, and the ring-shaped recess and the purge groove provided to the male thread may communicate with each other.

In order to easily extract only the sample gas generated from the sample by heating the crucible in the sealed space, the first electrode includes a housing recess in which the crucible is housed, and the second electrode is movable between a first position at which the crucible is nipped between the second electrode and the first electrode inside the housing recess, and a second position at which the crucible is positioned outside the housing recess, the second position being separated from the first position by a predetermined distance.

As a specific embodiment of the second electrode, the second electrode is configured in such a manner that the crucible is placed thereon.

Advantageous Effects of Invention

As described above, with the elemental analysis device according to the present invention, because the purge groove extending in the pitch direction is provided as a cutout provided to a part of the crests of a thread of the screwing structure that is provided between the second electrode main body and the cap, it is possible to discharge the air inside the gap to the outside merely by screwing the male thread into the female thread in a process of attaching the second electrode tip. Therefore, it is possible to prevent components other than the sample gas from leaking from the inside of the second electrode at the time of an elemental analysis, and from introducing an analysis error.

Figure 1:
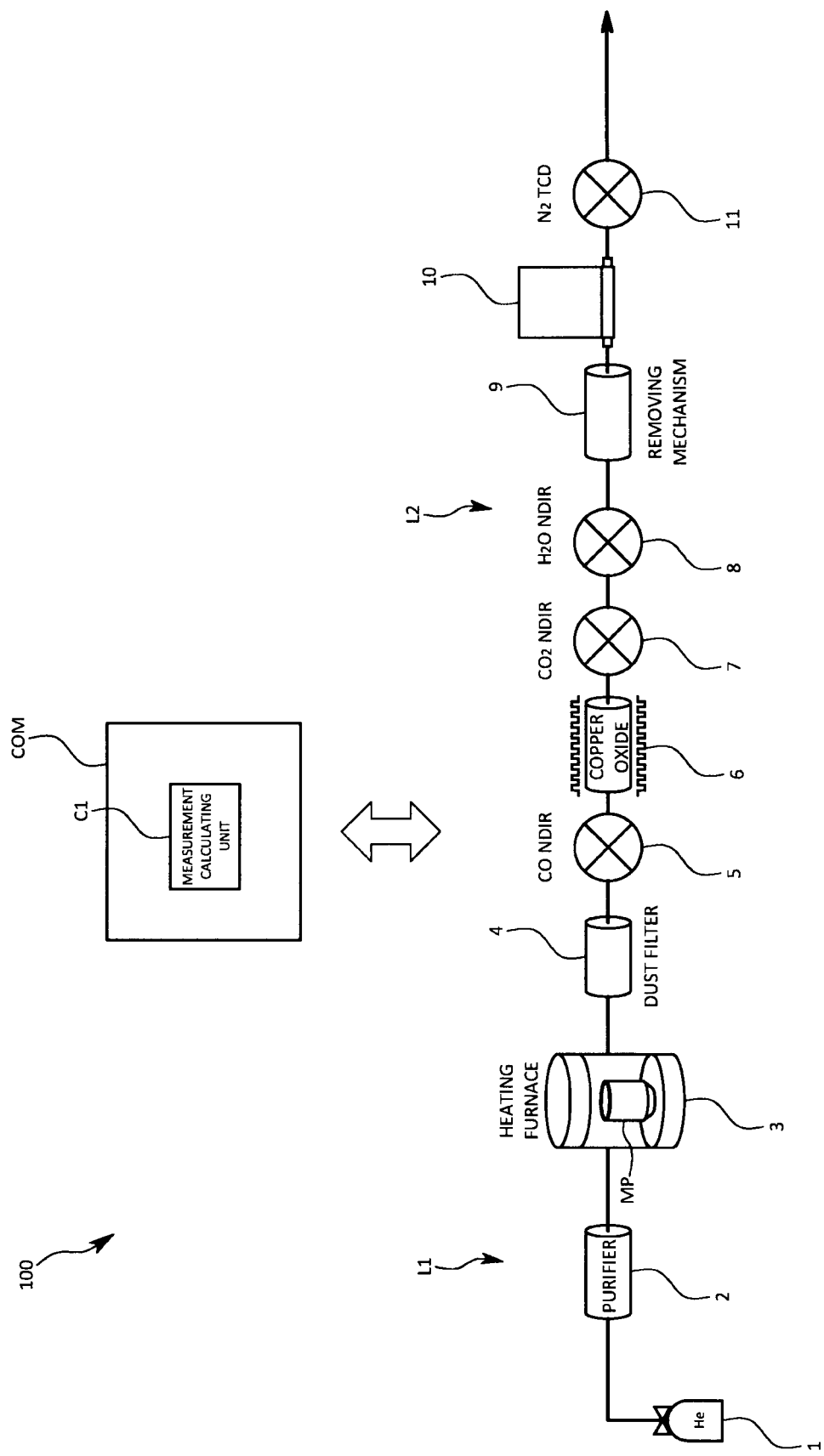
FIG. 1 is a schematic diagram of an elemental analysis device according to a first embodiment of the present invention.

REFERENCE SIGNS LIST 100 elemental analysis device
1 supply source
2 purifier
3 heating furnace
31 first electrode
31B first electrode main body
311 housing recess
312 outlet
313 sample inlet
31C first electrode tip
314 inserted tube
315 flange portion
316 through-hole
317 gas passage groove
31S first screwing structure
32 second electrode
32B second electrode main body
ST stepped portion
322 recess 32C second electrode tip
32D cap
32S second screwing structure
323 exposure opening
324 pressing plate
325 vent hole
326 gas discharge groove
327 ring-shaped recess
32F purge channel
4 dust filter
5 CO detecting unit
6 oxidant
7 $CO_2$ detecting unit
8 $H_2O$ detecting unit
9 removing mechanism
10 mass flow controller
11 $N_2$ detecting unit (thermal conductivity analyzing unit)

DESCRIPTION OF EMBODIMENTS

An elemental analysis device 100 according to a first embodiment of the present invention will now be explained with reference to some drawings. FIG. 1 gives a general view of the elemental analysis device 100 according to the first embodiment. The elemental analysis device 100 measures the amount of an element contained in a sample by heating and dissolving a sample such as a metal or a ceramic (hereinafter, simply referred to as a sample) stored in a graphite crucible MP, and by analyzing a sample gas generated thereby. In the first embodiment, C (carbon), H (hydrogen), and N (nitrogen) contained in the sample are to be measured.

As illustrated in FIG. 1, the elemental analysis device 100 includes a heating furnace 3 that heats the sample stored in the crucible MP, an incoming channel L1 for introducing carrier gas into the heating furnace 3, and an outgoing channel L2 for discharging mixed gas that is a mixture of the carrier gas and the sample gas from the heating furnace 3. More specifically, the elemental analysis device 100 includes the heating furnace 3, devices that are provided to the incoming channel L1 or the outgoing channel L2, and a control processing mechanism COM that governs the control of these devices and processing such as concentration measurements. The control processing mechanism COM is what is called a computer including a CPU, a memory, an A/D converter, a D/A converter, and various input/output units, for example, and functions as a measurement calculating unit C1, which will be described later, by executing a program stored in the memory and cooperating with various devices. The control processing mechanism COM also functions as a display unit (not illustrated) that displays the concentrations of various elements contained in the sample based on the outputs of a CO detecting unit 5, a $CO_2$ detecting unit 7, an $H_2O$ detecting unit 8, and a $N_2$ detecting unit 11, all of which will be described later, for example.

Each of these units will now be explained in detail.

A gas cylinder that is a supply source 1 of the carrier gas is connected to a base end of the incoming channel L1. In the first embodiment, the supply source 1 supplies He (helium) into the incoming channel L1. The incoming channel L1 is also provided with a purifier 2 for increasing the purity of the carrier gas by removing a very small amount of hydrocarbon contained in the carrier gas.

The purifier 2 is made of a material having a property of physically adsorbing hydrocarbon contained in the carrier gas, but substantially not adsorbing the carrier gas itself The material of the purifier 2 does not chemically react with the carrier gas or hydrocarbon. In other words, the purifier 2 is a purifier also used in gas chromatograph, for example. Zeolite-based molecular sieve may be used as a material of which the purifier 2 is made, for example. Other examples of the material of the purifier 2 include silica gel, activated carbon, and ascarite. By heating the purifier 2, for example, the purifier 2 can desorb the molecules adsorbed thereby, and has its adsorption capacity regenerated.

The heating furnace 3 is configured to hold a graphite crucible MP containing a sample between a pair of electrodes, and to heat the crucible MP and the sample by applying a current to the crucible MP directly. When the sample is heated, a pressure adjusting valve (not illustrated) provided on the upstream of the heating furnace 3 adjusts the pressure of the carrier gas so that the pressure inside the heating furnace 3 is set 60 kPa or lower, and more preferably, 40 kPa or lower. The electrodes in the heating furnace 3 will be explained later.

The devices provided to the outgoing channel L2 will now be explained.

To the outgoing channel L2, a dust filter 4, a CO detecting unit 5, an oxidant 6, a $CO_2$ detecting unit 7, an $H_2O$ detecting unit 8, a removing mechanism 9, a mass flow controller 10, and a $N_2$ detecting unit 11 that is a thermal conductivity analyzing unit are disposed from the upstream side in the order listed herein.

The dust filter 4 filters and removes soot and the like contained in the sample gas.

The CO detecting unit 5 detects and measures a concentration of CO (carbon monoxide) contained in the mixed gas having passed through the dust filter 4, and is implemented as a non-dispersive infrared gas analyzer (NDIR). The CO detecting unit 5 operates effectively when the oxygen concentration of the sample is high, due to its measurement accuracy. Specifically, CO at a concentration of 150 ppm or higher is preferably measured.

The oxidant 6 oxidizes CO and $CO_2$ contained in the mixed gas having passed through the CO detecting unit 5, and also oxidizes $H_2$ into $H_2O$ (water) to generate water vapor. In the first embodiment, copper oxide is used as the oxidant 6, and the temperature of the copper oxide is maintained at a temperature of 450° C. or lower by a heat generating resistor provided around the oxidant 6.

The $CO_2$ detecting unit 7 is an NDIR that detects and measures the concentration of $CO_2$ in the mixed gas having passed through the oxidant 6. From the viewpoint of the measurement accuracy, the $CO_2$ detecting unit 7 operates effectively when the concentration of the oxygen contained in the sample is low (e.g., 150 ppm or lower).

The $H_2O$ detecting unit 8 is an NDIR that detects and measures the concentration of $H_2O$ in the mixed gas having passed through the $CO_2$ detecting unit 7. The channel leading from the oxidant 6 to the $H_2O$ detecting unit 8 is configured to maintain the temperature of the mixed gas at 100° C. or higher so that $H_2O$ is maintained in the water vapor phase. In this manner, any measurement error due to the dew condensation in the $H_2O$ detecting unit 8 is prevented.

The removing mechanism 9 adsorbs to remove $CO_2$ and $H_2O$ contained in the mixed gas. The removing mechanism 9 is an adsorbent, and the same absorbent as that used as the purifier 2, provided to the incoming channel L1 described above, is used, for example.

The mass flow controller 10 is a flow rate controller including a flow rate sensor M1, a control valve M2, and a flow rate controller M3 that are packaged into one. The mass flow controller 10 supplies the mixed gas the flow rate of which is kept constant at a set flow rate to the $N_2$ detecting unit 11 positioned downstream thereof. Therefore, even if the pressure of the mixed gas fluctuates because of the removing mechanism 9, it is possible to maintain the pressure of the mixed gas inside the $N_2$ detecting unit 11 at a level suitable for the measurement. In the first embodiment, in order to maintain the pressure in the heating furnace 3 to 60 kPa, the mass flow controller 10 is configured to operate even at a pressure lower than 60 kPa, even with the presence of a differential pressure of 20 kPa prior to and subsequent to the heating furnace 3, for example.

The $N_2$ detecting unit 11 is a thermal conductivity detector (TCD), and measures the concentration of $N_2$ that is a predetermined chemical component of the mixed gas, based on a change in the thermal conductivity of the mixed gas, and on the flow rate of the mixed gas being supplied thereto. In other words, because the mixed gas supplied to the $N_2$ detecting unit 11 is composed substantially only of the carrier gas and $N_2$, a change in the measured thermal conductivity reflects the $N_2$ concentration of the mixed gas. In the first embodiment, a flow meter is not provided downstream of the $N_2$ detecting unit 11, and an exhaust port of the outgoing channel L2 is directly connected downstream of the $N_2$ detecting unit 11.

Measurement signals indicating the concentrations of the chemical components obtained by the respective detecting units are input to the measurement calculating unit C1. The measurement calculating unit C1 calculates the concentrations of O, H, and N included in the sample based on the respective measurement signals. As a calculation of the concentration of the oxygen contained in the sample, if the oxygen concentration of the sample is equal to a predetermined threshold (150 ppm) or higher, the measurement calculating unit C1 sets the oxygen concentration obtained by the CO detecting unit 5 as an output value. If the oxygen concentration is lower than the threshold, the oxygen concentration obtained by the $CO_2$ detecting unit 7 is set as an output value.

Finally, the pair of electrodes provided in the heating furnace 3 will now be explained in detail.

Figure 2:
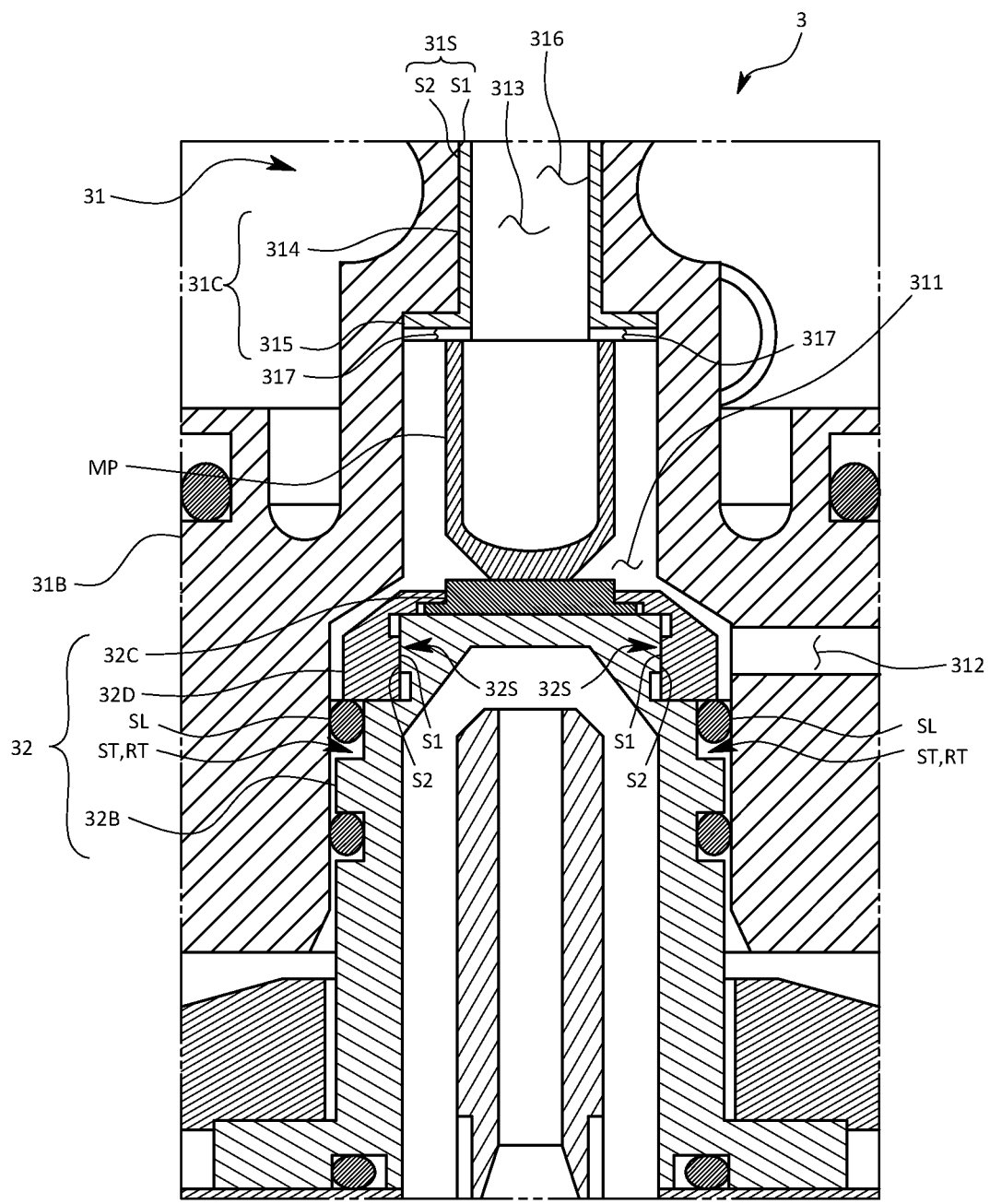
FIG. 2 is a schematic sectional view illustrating a crucible nipped between a first electrode and a second electrode according to the first embodiment.
Figure 3:
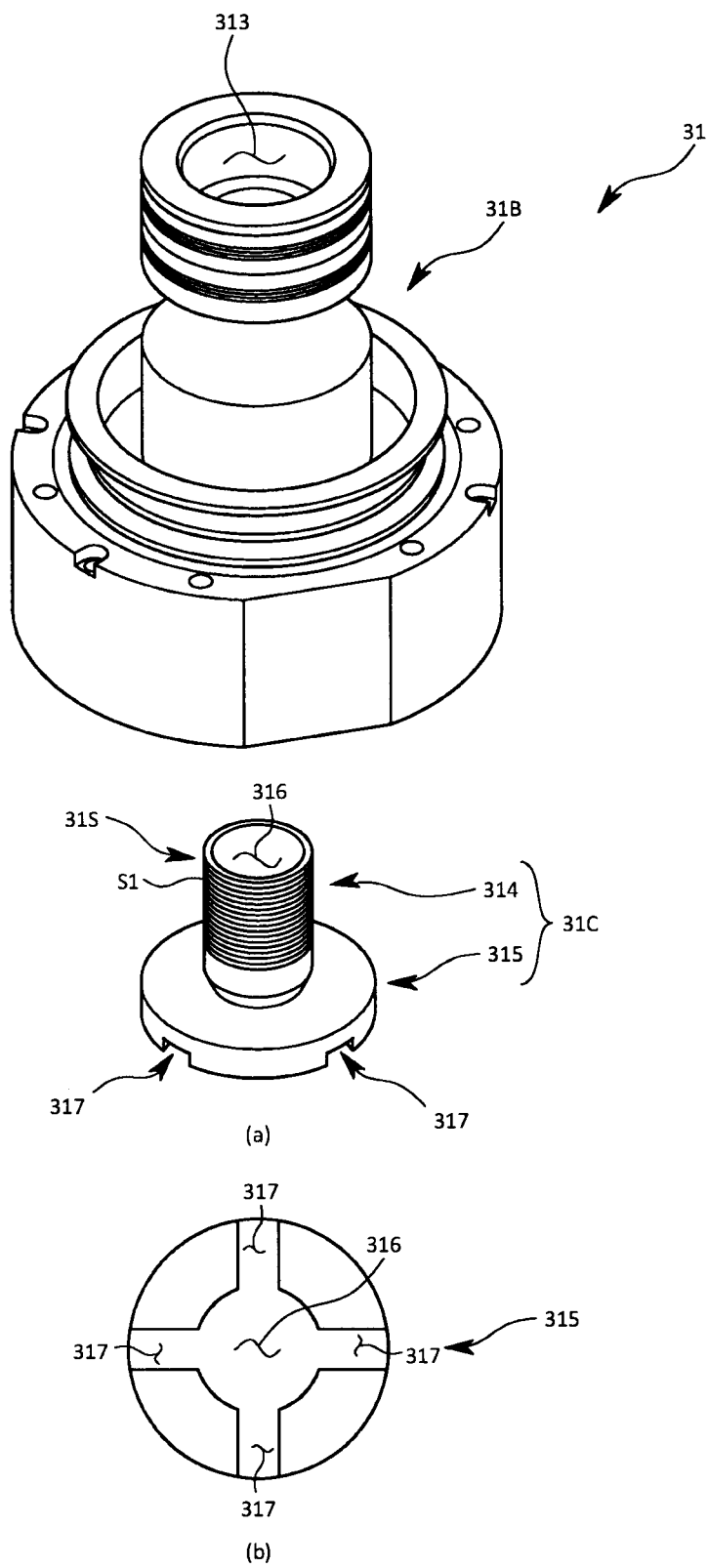
FIG. 3 is a schematic exploded perspective view of the first electrode according to the first embodiment, and a schematic view illustrating an end surface of a flange portion.
Figure 4:
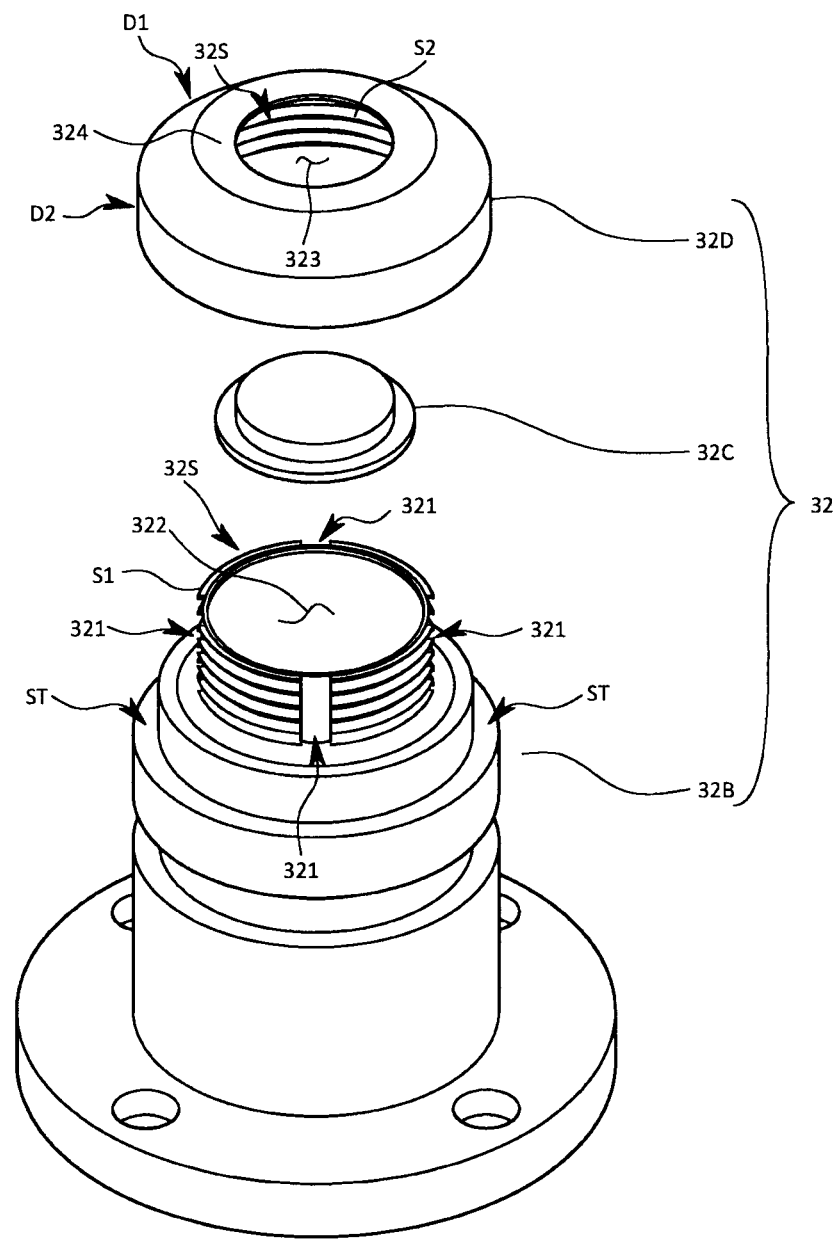
FIG. 4 is a schematic exploded perspective view of the second electrode according to the first embodiment.

As illustrated in the sectional view in FIG. 2 and the perspective views in FIGS. 3 and 4, the heating furnace 3 includes a first electrode 31 that is an upper electrode fixed on the upper side, and a second electrode 32 that is a lower electrode provided on a lower side and on which the crucible MP is placed.

As illustrated in FIG. 3(*a*), the first electrode 31 is a substantially two-staged cylindrical electrode, with an upper part having a flat cylindrical shape and a lower part having a flat disk-like shape. As illustrated in the sectional view in FIG. 2, the first electrode 31 includes a first electrode main body 31B and a first electrode tip 31C. To a central lower part of the first electrode main body 31B, a hollow and cylindrical housing recess 311 in which the crucible MP is housed is provided. The first electrode tip 31C is provided inside the housing recess 311, removably from the first electrode main body 31B. The first electrode tip 31C is a part with which an upper end rim of the substantially cylindrical crucible MP is brought into direct contact. The first electrode tip 31C becomes consumed as the elemental analysis is repeated. The first electrode main body 31B is made of copper, for example, and the first electrode tip 31C is made of a copper alloy containing tungsten, for example. In other words, the first electrode tip 31C is made of a material exhibiting higher hardness than the first electrode main body 31B.

The first electrode main body 31B delineates an outer shape of the first electrode 31, and the cylindrical housing recess 311 extends, in the vertical direction, into the center of the flat disk-shaped portion, as illustrated in the sectional view of FIG. 2. In addition, a sample gas outlet 312 extending in the horizontal direction is provided in a manner opening to a side surface of the housing recess 311. A sample inlet 313 through which the sample is placed in the crucible MP is provided on the upper surface of the housing recess 311. The sample inlet 313 is a hole having a shape of a hollow cylinder with a small diameter that is smaller than that of the housing recess 311, and provided in a manner extending in the vertical directions along the central axis of the first electrode 31.

The first electrode tip 31C has a substantially two-staged cylindrical shape, and includes, as illustrated in FIGS. 2 and 3(*a*), an inserted tube 314 that has the shape of a cylinder with a small diameter and that is to be inserted into the sample inlet 313 of the first electrode main body 31B, and a flat plate-shaped flange portion 315 that extends radially from the bottom end of the inserted tube 314. The first electrode tip 31C also has a through-hole 316 passing through the inserted tube 314 and the flange portion 315 in the axial direction, and gas passing grooves provided to the flange portion 315. Each of the gas passing grooves extends in the radial direction, and one end of the gas releasing groove opens at least to a side surface of the through-hole 316. As illustrated in the bottom view of the first electrode tip 31C in FIG. 3(*b*), four gas passing grooves are provided at an interval of 90°, axially symmetrically to one another with respect to the central axis. As illustrated in FIG. 2(*b*), inner ends of the gas passing grooves, being inner in the radial direction, open to the inside of the crucible MP. In the first embodiment, the other ends of the gas passing grooves open to the outer circumferential surface of the flange portion 315. In other words, the sample gas generated by heating the sample inside the crucible MP flows from the inside of the crucible MP, through the gas passing grooves, and to the outside of the crucible MP. The sample gas then flows out of the housing recess 311, through the outlet 312 formed in the first electrode main body 31B, into the outgoing channel L2.

A fixing structure for removably fixing the first electrode tip 31C to the first electrode main body 31B is provided between the first electrode main body 31B and the first electrode tip 31C. More specifically, between the outer circumferential surface of the inserted tube 314 of the first electrode tip 31C, and the inner circumferential surface of the sample inlet 313 of the first electrode main body 31B, a first screwing structure 31S including a male thread S1 and a female thread S2 is provided, as the fixing structure. With this first screwing structure 31S, the first electrode tip 31C is configured to be removable from the first electrode main body 31B. In addition, any groove cut out in the pitch direction is not provided on the screw thread of the first screwing structure 31S. Therefore, when the first screwing structure 31S is completely screwed, the flange portion 315 and a top wall surface of the housing recess 311 are brought into close contact with each other, and the male thread S1 and the female thread S2 are brought into close contact with each other, without any gap therebetween. Therefore, it is possible to prevent the sample gas having flown out of the crucible MP from being caught in the gap between the first electrode main body 31B and the first electrode tip 31C, or from flowing back.

The second electrode 32 will now be explained with reference to FIGS. 2 and 4.

The second electrode 32 is configured to be movable in the vertical directions by an air cylinder (not illustrated), for example, and is inserted into the housing recess 311, together with the crucible MP a part of which is placed thereon. Specifically, the second electrode 32 is configured to be movable between a first position at which the crucible MP in the housing recess 311 is nipped between the first electrode 31 and the second electrode, and a second position that is separated from the first position by a predetermined distance and at which the crucible MP is positioned outside the housing recess 311.

The second electrode 32 is also provided with a second electrode main body 32B that has a substantially stepped cylindrical shape and a thin disk-shaped second electrode tip 32C provided on a tip end surface of the second electrode main body 32B, and a cap 32D by which the second electrode tip 32C is fixed to the second electrode main body 32B and that has an exposure opening through which a contact surface of the second electrode tip 32C is exposed to the outside. The contact surface is a surface that is brought into contact with the crucible MP. The second electrode main body 32B and the cap 32D are made of copper, and the second electrode tip 32C is made of a copper alloy containing tungsten.

As described above, the second electrode 32 includes three separate parts, and is configured such that only the second electrode tip 32C can be replaced. More specifically, a second screwing structure 32S including a male thread S1 and a female thread S2 is provided between the outer circumferential surface of the second electrode main body 32B on the tip end, and an inner circumference of the cap 32D.

The structure of the second screwing structure 32S is different from that of the first screwing structure 31S provided to the first electrode 31. In other words, as illustrated in FIG. 4, the male thread S1 of the second screwing structure 32S has purge grooves 321 each of which extends in the pitch direction of the screw thread and is provided as a cutout provided to a part of the crest of the thread. The purge grooves 321 are formed by cutting down the crests of the screw thread to a level corresponding to the root of the screw thread, for example, but may be shallower. In addition, four purge grooves 321 are provided at every 90°, axially symmetrically to one another, with respect to the central axis of the second electrode 32. Without limitation to the four, the number of the purge grooves 321 provided may be less than four or more than four. Furthermore, the purge grooves 321 do not necessarily need to be arranged axially symmetrically.

Because the purge grooves 321 are provided, even if the air inside the gap between the crests of the threads of the second screwing structure 32S is accumulated between the crests of the screw threads when the cap 32D is attached, it is possible to discharge the air inside the second electrode 32 to the outside of the second electrode 32 through the purge grooves 321, when the air inside the heating furnace 3 is replaced with the carrier gas, for example.

The second electrode main body 32B has such a recess 322 on a tip end surface thereof that the rear surface of the second electrode tip 32C is substantially fitted thereinto, and also has a stepped portion ST that faces the rim of the cap 32D on the tip end side, as illustrated in FIG. 2. On the tip end side of the second electrode 32, the diameter is the smallest on the tip end surface where the second electrode tip 32C is attached, and is increased, at the stepped portion ST, to an outer diameter substantially equal to the outer diameter of an O ring SL attached thereto.

Specifically, by fitting the second electrode tip 32C into the recess 322 in advance, as a preliminary step, it is possible to achieve the alignment between the second electrode tip 32C and the second electrode main body 32B. Furthermore, by screwing the cap 32D onto the second electrode main body 32B with the position of the second electrode tip 32C established, the second electrode tip 32C can be fixed, with the second electrode tip 32C maintained at the correct position.

The O ring SL is disposed inside a ring-shaped groove RT formed between the stepped portion ST of the second electrode main body 32B and the rim of the cap 32D. In other words, before the cap 32D is attached, there is no member that restricts the movement of the O ring SL in the axial direction. The ring-shaped groove RT also has a size slightly larger than the thickness of the O ring SL. As the second electrode 32 is inserted into the housing recess 311 of the first electrode main body 31B so as to nip the crucible MP between the electrodes and to apply a current thereto, the O ring SL is carried toward and is brought into abutment against the rim of the cap 32D, and seals the housing recess 311. With such a configuration, it is not necessary to attach the O ring SL by extending the inner diameter of the O ring SL to an extremely large size, as has been conventionally done. Therefore, the attachment of the O ring SL can be simplified.

The cap 32D has a top surface D1 and a side surface D2. The top surface D1 has an exposure opening 323 through which the second electrode tip 32C is exposed to the outside, and a pressing plate 324 that is provided around the exposure opening 323 and presses the second electrode tip 32C against the tip end surface of the second electrode main body 32B when the cap 32D is screwed into the second electrode main body 32B. The side surface D2 has the female thread S1 provided on the inner circumferential surface thereof. In addition, because a gap is ensured between an end surface of the side surface D2 and the second electrode main body 32B, when the cap 32D is completely screwed onto the second electrode main body 32B, the air from the bottom rim of the cap 32D and passed through the purge grooves 321 is not prevented from being discharged to the outside of the second electrode 32.

In the elemental analysis device 100 having a configuration described above, because the first screwing structure 31S makes the first electrode tip 31C removable from the first electrode main body 31B, when the first electrode tip 31C is consumed by repetitive use in the elemental analysis, only the first electrode tip 31C can be replaced. Therefore, it is not necessary to replace the entire first electrode 31 including the first electrode main body 31B, as has been required conventionally.

In addition, because the second screwing structure 32S provided between the second electrode main body 32B and the cap 32D makes the second electrode tip 32C removable, when the second electrode tip 32C is worn out, it is possible to replace only this part.

Based on the above, it is possible to make a large reduction in the labor and the cost in the replacement of the consumables required to continue the elemental analysis in the heating furnace 3, as compared with the conventional example.

In addition, the second screwing structure 32S includes the purge grooves 321 penetrating the crests of the thread in the pitch direction. Therefore, by filling the carrier gas inside the heating furnace 3 before the sample is heated, the air in the second electrode 32 can be discharged to the outside via the purge grooves 321. It is also possible to ensure that there is no air in the second electrode 32 when the sample is heated. Therefore, it is possible to ensure that there is no leakage of thermally expanded air from the second electrode 32, when the sample gas is generated, as has been conventionally. In other words, because there is no leakage of the air that contains nitrogen (N), which could be an error factor, from the inside of the second electrode 32, when the sample gas is generated, it is possible to improve the accuracy at which the $N_2$ detecting unit 11 detects a very small amount of nitrogen (N) contained in the sample gas.

A mounting jig 200 used in an elemental analysis device according to a second embodiment of the present invention will now be explained with reference to FIGS. 5 and 6.

The mounting jig 200 according to the second embodiment is used in mounting the first electrode tip 31C on the first electrode main body 31B of the elemental analysis device 100 described in the first embodiment. In other words, the first electrode tip 31C that is as an axially symmetric component needs to be attached to the deepest part of the housing recess 311 of the first electrode main body 31B, and the first electrode tip 31C has higher hardness than the first electrode main body 31B. Therefore, if the first electrode tip 31C is mounted without the mounting jig 200, the first electrode tip 31C may scrape off the first electrode main body 31B, and be attached obliquely. In order to solve such a problem, it is necessary to rotate and screw the first electrode tip 31C in an orientation in which the axial direction of the first electrode tip 31C is matched with that of the first electrode main body 31B, inside the housing recess 311 of the first electrode main body 31B.

Figure 5:
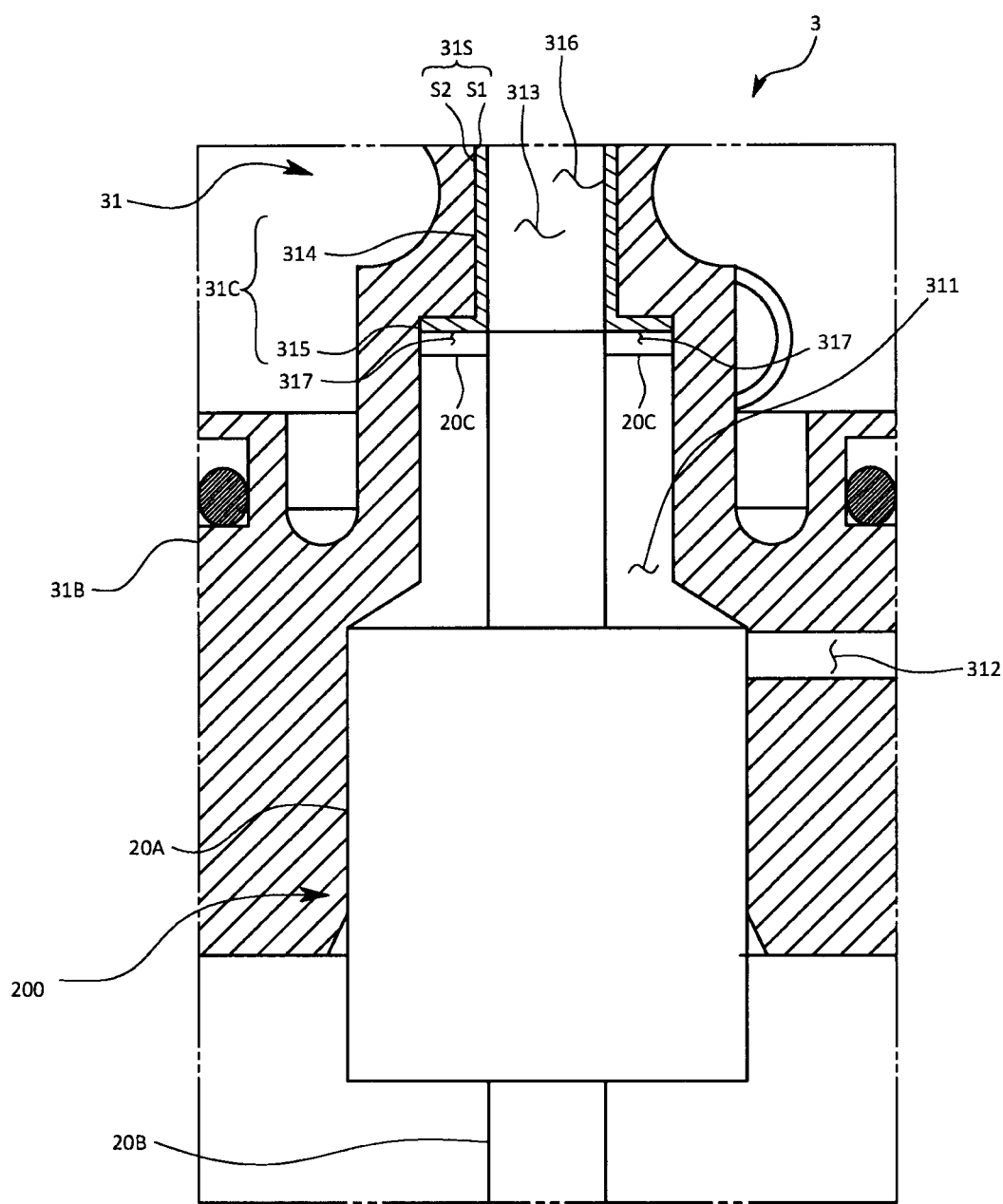
FIG. 5 is a schematic sectional view illustrating a mounting jig during its use, the mounting jig used with an elemental analysis device according to a second embodiment of the present invention.
Figure 6:
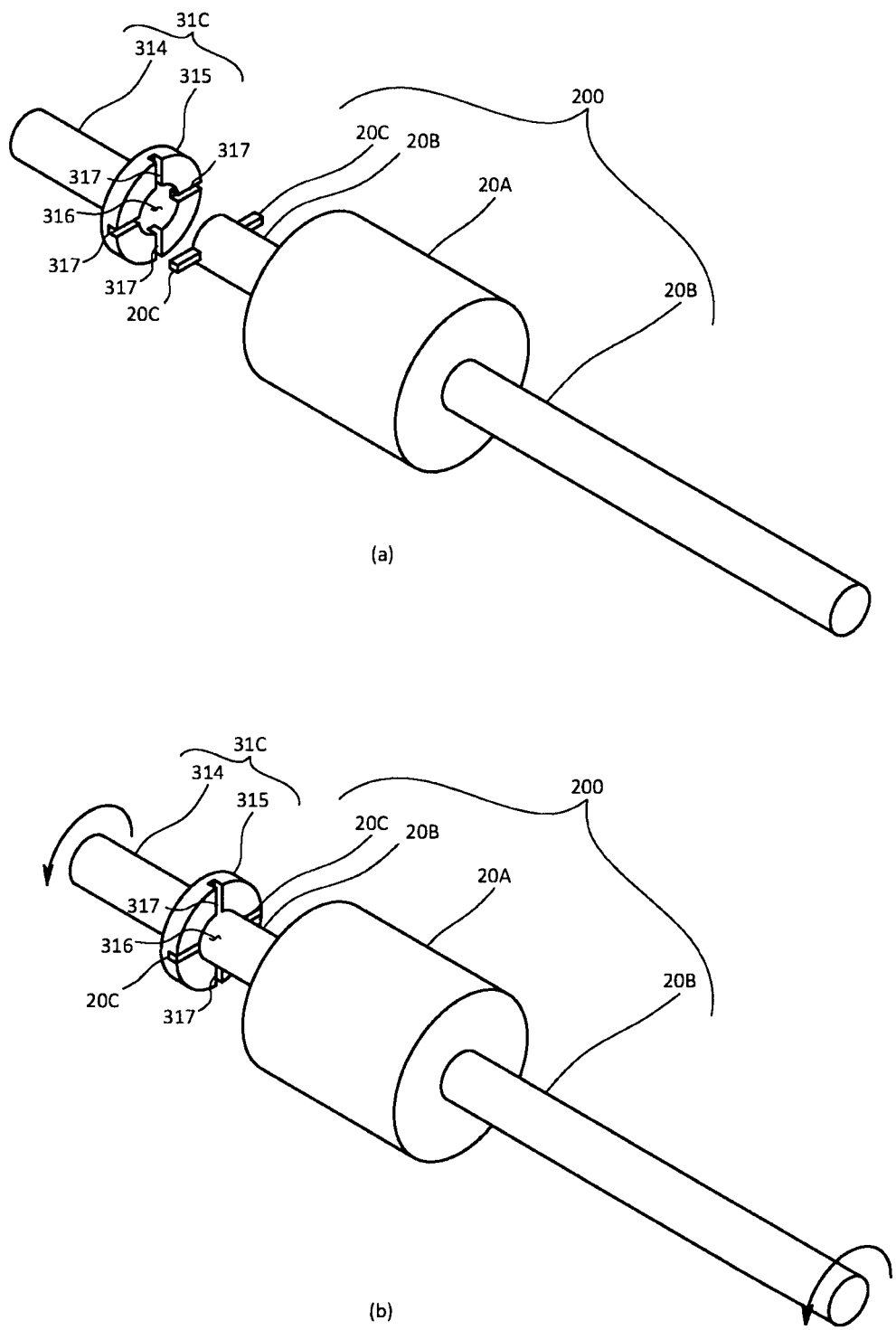
FIG. 6 is a schematic perspective view illustrating the mounting jig according to the second embodiment.

Specifically, as illustrated in the sectional view in FIG. 5 and the perspective view in FIG. 6, the mounting jig 200 includes: a cylindrical guide 20A that is to be fitted into the housing recess 311; a rotating shaft 20B that is a cylindrical rod-like member mounted in a manner matching the guide 20A in the axial direction and that is rotatably provided to the guide 20A; and engaging members 20C that are provided in a manner protruding in radial directions from the tip end of the rotating shaft 20B and that have substantially rectangular parallelepiped shapes to be engaged with gas passage grooves 317, respectively, provided on the first electrode tip 31C.

In the second embodiment, the guide 20A has an outer diameter that is substantially the same as that of a part of the housing recess 311 where the diameter is the largest. By fitting the guide 20A into the housing recess 311, the axial directions of the guide 20A and the rotating shaft 20B can be substantially matched with the axial direction of the housing recess 311 of the first electrode main body 31B and the axial direction of the sample inlet 313. By rotating the rotating shaft 20B with respect to the guide 20A in such an orientation, it is possible to rotate the first electrode tip 31C with the engaging member 20C engaged with the gas passing grooves, and to screw the first electrode tip 31C into the first electrode main body 31B, while maintaining the correct orientation.

As described above, with the mounting jig 200 according to the second embodiment, it is possible to mount the first electrode tip 31C straightly on the deepest part of the housing recess 311, and to bring the entire end surface of the flange portion 315 of the first electrode tip 31C completely into contact with the rim of the crucible MP. Therefore, it is possible to prevent a situation where the sample cannot be heated as expected because of the lack of sufficient current flow due to the insufficient contact between the flange portion 315 and the crucible MP.

Other embodiments of the present invention will now be explained.

Figure 7:
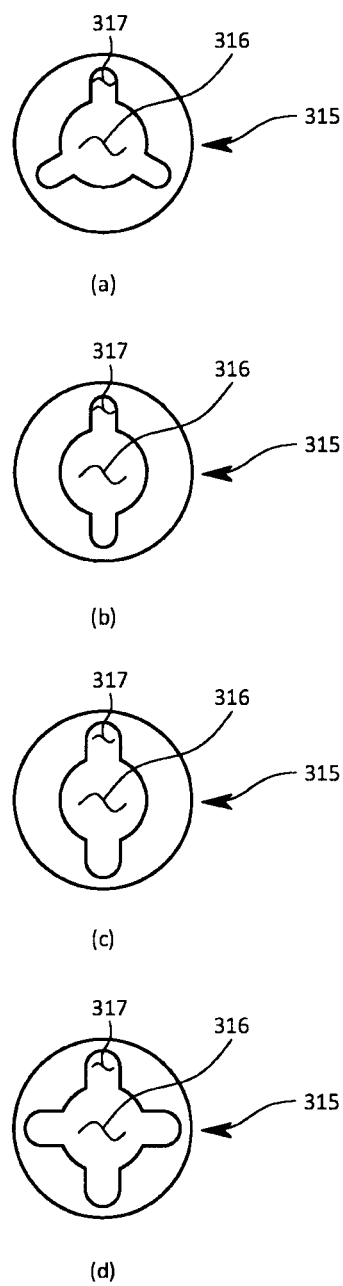
FIG. 7 is a schematic view illustrating examples of a first electrode tip according to other embodiments of the present invention.

As illustrated in each drawing in FIG. 7, the shape of the gas passage groove 317 provided on the first electrode tip 31C is not limited to that described in the above embodiments. For example, one end of the gas passage groove 317 may open only to the through-hole 316, and the other end of the gas passage groove 317 may not open to the outer circumferential surface of the flange portion 315. Furthermore, the number of gas passage grooves 317 is not limited to four, and may be two or three.

It is also possible to prepare the first electrode tips with a plurality of through-hole diameters. For example, when the sample to be fed has a rod-like shape, the diameter may be changed to an appropriate diameter so that sample is prevented from getting stuck between the sample inlet of the first electrode main body and the crucible. In other words, because it is possible to change the diameter of a passage where the sample is passed, appropriately, merely by replacing the first electrode tip, the first electrode tip can be easily replaced to one that matches the shape and the property of the sample. The fixing structure for removably fixing the first electrode tip to the first electrode main body is not limited to the first screwing structure. The fixing structure may be, for example, an engagement structure including an engagement claw and an engagement groove formed between the first electrode tip and the first electrode main body, or a fitting structure.

Figure 8:
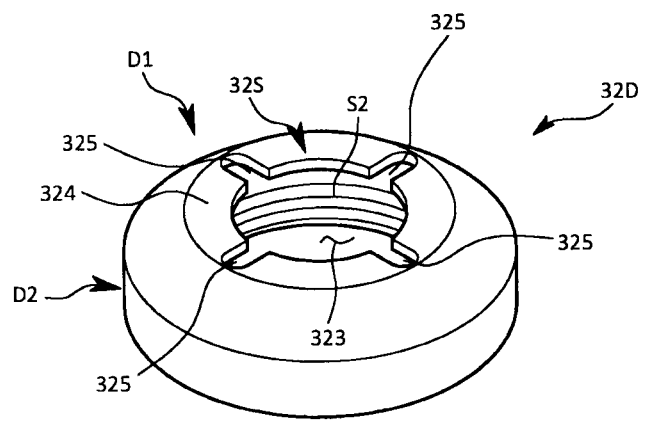
FIG. 8 is a schematic view illustrating a front side of a cap included in a second electrode according to another embodiment of the present invention.
Figure 8:
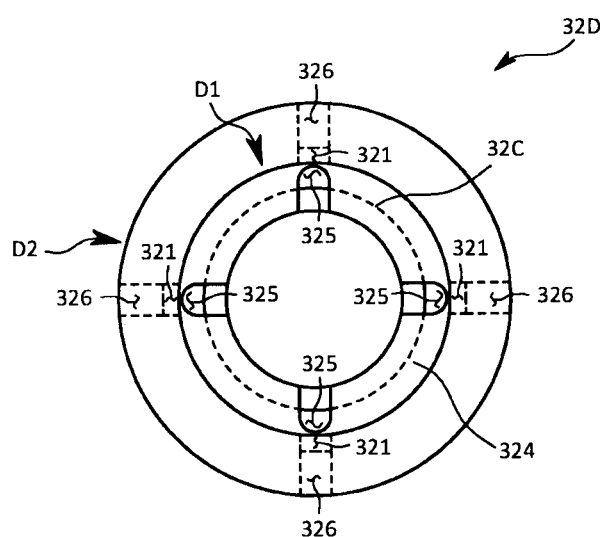
Figure 9:
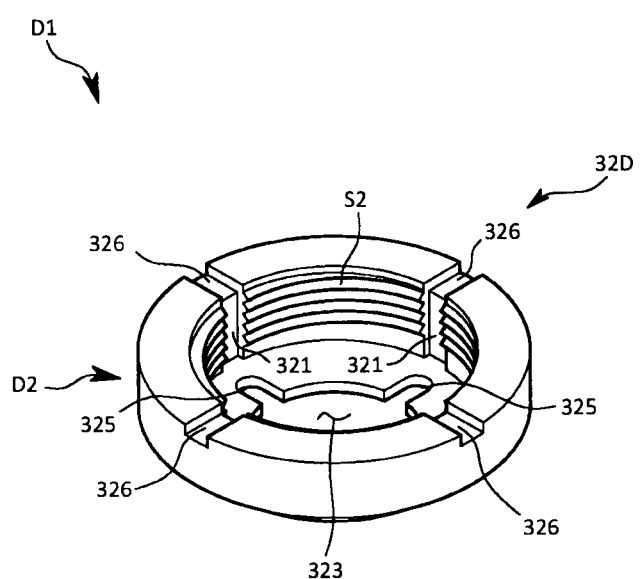
FIG. 9 is a schematic view illustrating a rear side of the cap included in the second electrode according to the other embodiment.

As illustrated in each of FIGS. 8(a), 8(b), and 9, as a modification of the cap 32D included in the second electrode 32, the cap 32D may include: vent holes 325 that open to the top surface D1 on the circumferentially outer side of the exposure opening 323 through which a part of the second electrode tip 32C is exposed to the outside; purge grooves 321 extending the thread pitch direction and provided as cutouts provided to a part of the crests of the female thread S2; and gas discharge grooves 326 provided on the bottom end surface of the side surface D2, the bottom end surface being the rim of the cap 32D, in a manner extending in the radial directions.

As illustrated in FIG. 8(b), the vent holes 325 are configured to connect the inside of the second electrode 32 to the outside, in the configuration in which the second electrode tip 32C is fixed by the cap 32D having been screwed onto the second electrode main body 32B. In other words, in this embodiment, the vent holes 325 are provided as cutouts extending in the radial directions from the exposure opening 323, and extends more outwards than the outermost circumference of the thin disk-shaped second electrode tip 32C, being fixed by the cap 32D. In addition, four vent holes 325 are provided at an interval of 90° axially symmetrically with respect to the central axis of the second electrode 32.

As illustrated in FIG. 9, four purge grooves 321 and four gas discharge grooves 326 are also provided at an interval of 90° axially symmetrically with respect to the central axis, and are disposed at substantially the same phases as the vent holes 325, respectively. Ends of the vent holes 325 are positioned near corresponding ends of the purge grooves 321, respectively, and each of the purge grooves 321 is orthogonal to corresponding one of the gas discharge grooves 326, which together form a continuous groove.

If the vent holes 325 are provided on the top surface D1 of the cap 32D in the manner described above, the air inside the gap between the crests of the threads of the second screwing structure 32S can be better released through the top surface D1 when the cap 32D is attached. In addition, with the gas discharge grooves 326, it is possible to better release the air between the rim of the cap 32D and the O ring SL. Therefore, even if the analysis is repeated and the second electrode 32 is thermally affected to cause a deformation of the purge grooves 321, or dust becomes deposited, it is possible to suppress a deterioration in the gas releasing performance.

Figure 10:
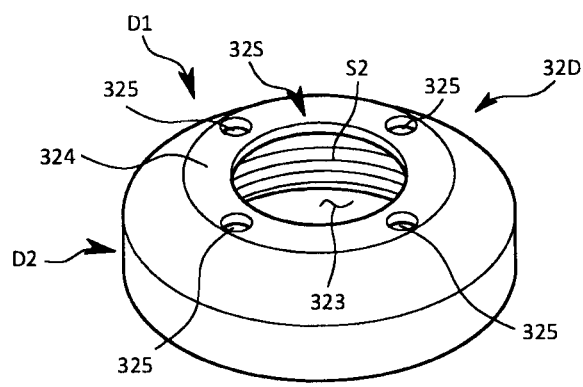
FIG. 10 is a schematic view illustrating still another example of the cap included in the second electrode.

FIG. 10 illustrates still another modification of the cap 32D. The vent holes 325 may be provided as through-holes, for example, instead of as cutouts. The through-holes may be provided at any positions on the outer side of the second electrode tip 32C being pressed by the cap 32D. Note that, in the cap 32D illustrated in FIGS. 8 to 10, three elements that are the vent holes 325, the purge grooves 321, and the gas discharge grooves 326 are arranged at in-phase positions, but their respective positions may be shifted from one another in the circumferential direction. Furthermore, the cap 32D may include at least one of the vent holes 325, the purge grooves 321, and the gas discharge grooves 326. For example, the cap 32D may be provided with either one of the vent holes 325 and the gas discharge grooves 326, and the purge grooves 321 may be provided only to the second electrode main body 32B. In addition, the outer size of the cap 32D itself may be reduced so that the gap between the outside of the side surface D2 and the inner surface of the first electrode 31 becomes equal to or larger than a predetermined size. In this manner, the air can be discharged even more easily through the gas discharge grooves 326.

Figure 11:
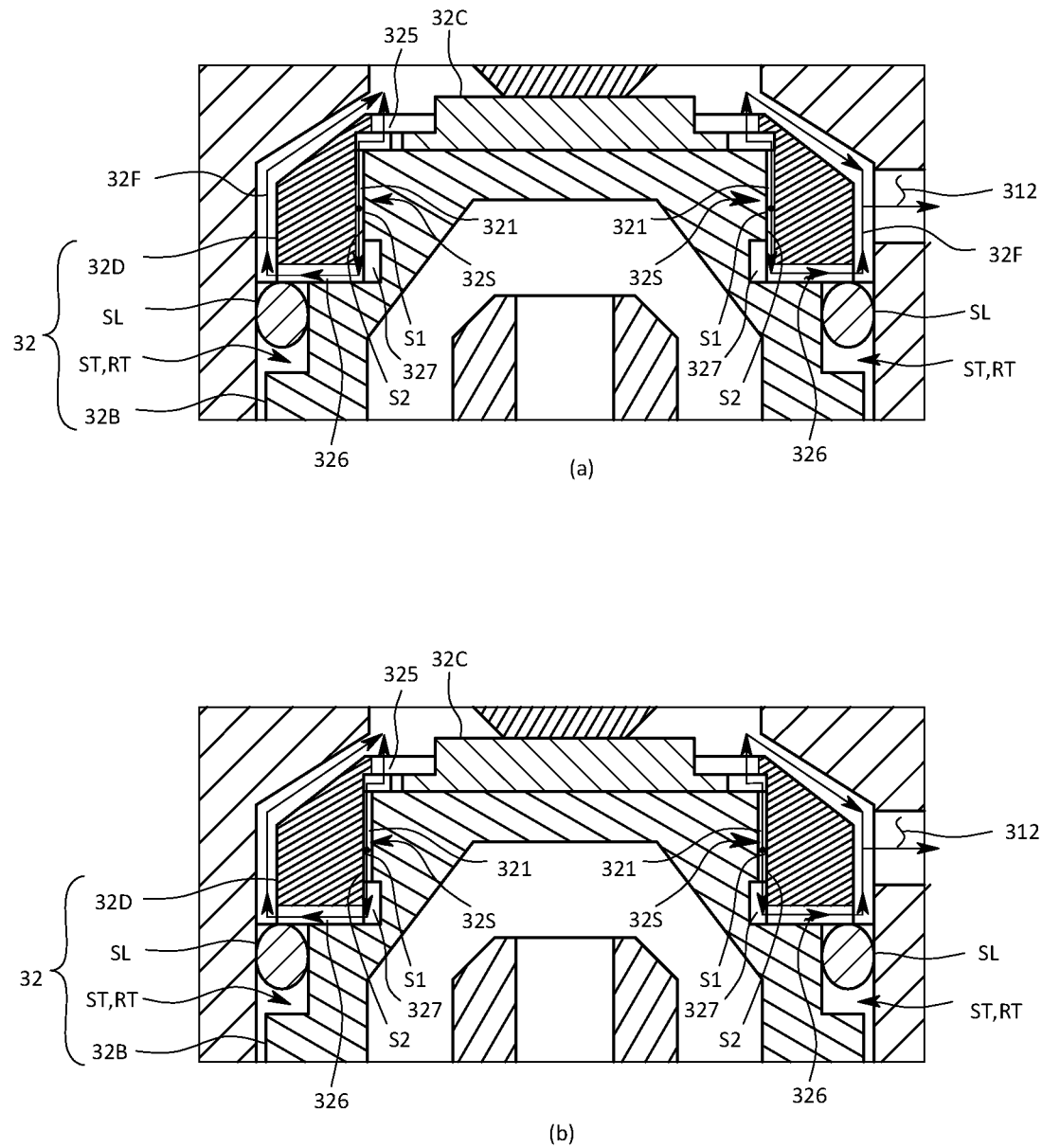
FIG. 11 is a schematic view illustrating a purge channel in a configuration in which a purge groove is provided to one of a female thread and a male thread.

As illustrated in FIG. 11, because purge channels 32F connecting the inside of the second screwing structure 32S to the outside of the second electrode 32 are provided, the air between the crests of the thread can be discharged quickly to the outside of the second electrode 32 when the cap 32D is attached to the second electrode main body 32B. Specifically, when the purge grooves 321 are provided to the female thread S2 of the cap 32D, as illustrated in FIG. 11(a), the air between the crests of the thread can be discharged through the purge grooves 321 and the vent holes 325 to the above the cap 32D, and also discharged through the gas discharge grooves 325 to the bottom of the cap 32D.

Furthermore, the purge channels 32F may also be formed in the same manner, with a configuration in which the purge grooves 321 are provided to the male thread S1 of the electrode main body 32B, and not to the female thread S2 of the cap 32D, as illustrated in FIG. 11(b). Specifically, a ring-shaped recess 327 is provided near the base end of the male thread S1 is provided, and this ring-shaped recess 327 is provided in a manner communicating with both of the purge grooves 321 and the In other words, the ring-shaped gas discharge grooves 325. recess 327 is provided by, for example, scraping the second electrode main body 3B off toward the inner side in the circumferential direction, to a depth substantially the same as the height of the crests of the male thread S1. Even in a configuration in which the purge grooves 321 are provided to the male thread S1 in the manner described above, the air residing between the crests of the thread can be quickly discharged to the outside of the second electrode 32, through the vent holes 325 or the gas discharge grooves 326 provided to the cap 32D.

The shapes of the second electrode tip and the cap are not limited to those described in the embodiments.

For example, instead of a circular shape, a cutout may be provided to a part, as a mark indicating the orientation in which the cap is attached, to aid adjusting the positions of the purge grooves in the second screwing structure to appropriate positions. It is also possible to provide the purge grooves, which are provided in the second screwing structure of the second electrode, not only to the male thread but also to the female thread. These purge grooves may be synchronized so that their positions in the circumferential direction substantially coincide with each other when the cap is completely screwed into the second electrode main body. In other words, the purge grooves provided on the male thread may be aligned to those provided on the female thread so that the area through which the air is allowed to pass is increased. It is also possible to provide the purge grooves only to the female thread.

The positional relationship between the first electrode and the second electrode, and the direction in which these electrodes move are not limited to those described in the embodiments. For example, the crucible may be housed inside the housing recess by moving the second electrode in the horizontal direction with respect to the fixed first electrode.

In addition, various modifications and combinations of the embodiments and parts thereof may be made within the scope not deviating from the gist of the present invention.

INDUSTRIAL APPLICABILITY

According to the present invention, it is possible to provide an elemental analysis device capable of preventing chemical components other than those of the sample gas from leaking from inside of the second electrode, and from introducing an analysis error at the time of an elemental analysis.

The invention claimed is:

1. An elemental analysis device that includes a first electrode and a second electrode between which a crucible containing a sample is nipped, and that heats the sample by applying a current between the first electrode and the second electrode, wherein
 the second electrode includes
  a second electrode main body that has a tip end having a substantially cylindrical shape,
  a second electrode tip that is provided on a tip end surface of the second electrode main body,
  a cap that nips the second electrode tip between the cap and the second electrode main body in such a manner that a part of the second electrode tip is exposed to an outside, and
  a second screwing structure that includes a male thread and a female thread provided between the second electrode main body and the cap, and
 the second screwing structure further includes a purge groove that extends in a pitch direction and that is provided as a cutout provided to a part of crests of a thread of at least one of the male thread and the female thread,
 a stepped portion is provided to a tip end side of the second electrode main body, and
 an O ring is provided inside a ring-shaped groove formed by the stepped portion and a rim of the cap when the cap is screwed onto the second electrode main body.

2. The elemental analysis device according to claim 1, wherein a recess into which a part of the second electrode tip is fitted is provided to the tip end surface of the second electrode main body.

3. The elemental analysis device according to claim 1, wherein
 a purge channel connecting an inside of the second screwing structure to an outside of the second electrode is provided, and
 the purge groove makes up at least a part of the purge channel.

4. The elemental analysis device according to claim 1, wherein
the cap includes
an exposure opening through which the second electrode tip is exposed to the outside,
a top surface including a pressing plate provided around the exposure opening and pressing the second electrode tip against the tip end surface of the second electrode main body when the cap is screwed onto the second electrode main body, and
a side surface having a substantially cylindrical shape and having an inner circumferential surface provided with the female thread.

5. The elemental analysis device according to claim 4, wherein the cap further includes one or more vent holes provided on the top surface, on an outer side of the exposure opening.

6. The elemental analysis device according to claim 4, wherein the cap further includes a gas discharge groove extending in the side surface, from an inner circumferential side to an outer circumferential side.

7. The elemental analysis device according to claim 1, wherein the purge groove is provided to the female thread of the cap.

8. The elemental analysis device according to claim 1, wherein the purge groove is provided to the male thread of the second electrode main body.

9. The elemental analysis device according to claim 8, further comprising a ring-shaped recess provided near a base end of the male thread of the second electrode main body, wherein
the ring-shaped recess and the purge groove provided to the male thread communicate with each other.

10. The elemental analysis device according to claim 1, wherein
the first electrode includes a housing recess in which the crucible is housed, and
the second electrode is movable between a first position at which the crucible is nipped between the second electrode and the first electrode inside the housing recess, and a second position at which the crucible is positioned outside the housing recess, the second position being separated from the first position by a predetermined distance.

11. The elemental analysis device according to claim 1, wherein the crucible is placed on the second electrode.

12. An elemental analysis device that includes a first electrode and a second electrode between which a crucible containing a sample is nipped, and that heats the sample by applying a current between the first electrode and the second electrode, wherein
the second electrode includes
a second electrode main body that has a tip end having a substantially cylindrical shape,
a second electrode tip that is provided on a tip end surface of the second electrode main body,
a cap that nips the second electrode tip between the cap and the second electrode main body in such a manner that a part of the second electrode tip is exposed to an outside, and
a second screwing structure that includes a male thread and a female thread provided between the second electrode main body and the cap, and
the second screwing structure further includes a purge groove that extends in a pitch direction and that is provided as a cutout provided to a part of crests of a thread of at least one of the male thread and the female thread
wherein the cap includes
an exposure opening through which the second electrode tip is exposed to the outside,
a top surface including a pressing plate provided around the exposure opening and pressing the second electrode tip against the tip end surface of the second electrode main body when the cap is screwed onto the second electrode main body,
a side surface having a substantially cylindrical shape and having an inner circumferential surface provided with the female thread, and
one or more vent holes provided on the top surface, on an outer side of the exposure opening.

13. An elemental analysis device that includes a first electrode and a second electrode between which a crucible containing a sample is nipped, and that heats the sample by applying a current between the first electrode and the second electrode, wherein
the second electrode includes
a second electrode main body that has a tip end having a substantially cylindrical shape,
a second electrode tip that is provided on a tip end surface of the second electrode main body,
a cap that nips the second electrode tip between the cap and the second electrode main body in such a manner that a part of the second electrode tip is exposed to an outside, and
a second screwing structure that includes a male thread and a female thread provided between the second electrode main body and the cap, and
the second screwing structure further includes a purge groove that extends in a pitch direction and that is provided as a cutout provided to a part of crests of a thread of at least one of the male thread and the female thread
wherein the cap includes
an exposure opening through which the second electrode tip is exposed to the outside,
a top surface including a pressing plate provided around the exposure opening and pressing the second electrode tip against the tip end surface of the second electrode main body when the cap is screwed onto the second electrode main body,
a side surface having a substantially cylindrical shape and having an inner circumferential surface provided with the female thread, and
a gas discharge groove extending in the side surface, from an inner circumferential side to an outer circumferential side.

* * * * *